United States Patent
Behrendt et al.

[11] Patent Number: 5,498,839
[45] Date of Patent: Mar. 12, 1996

[54] CABLE SLEEVE COMPOSED OF A PIPE SECTION AND SEAL MEMBERS AT THE FACE END

[75] Inventors: Martin Behrendt, Hagen; Adolf Franz; Roland Hunke, both of Iserlohn; Roland Roether, Hagen, all of Germany

[73] Assignee: RXS Schrumpftechnik-Garnituren GmbH, Hagen, Germany

[21] Appl. No.: 239,120

[22] Filed: May 6, 1994

[30] Foreign Application Priority Data

May 27, 1993 [DE] Germany .................. 43 17 723.9

[51] Int. Cl.[6] .................................................. H02G 15/113
[52] U.S. Cl. .................. 174/92; 174/77 R; 174/93
[58] Field of Search .......................... 174/92, 93, 77 R

[56] References Cited

U.S. PATENT DOCUMENTS

| | | | |
|---|---|---|---|
| 3,557,299 | 1/1971 | Dienes | 174/38 |
| 4,103,911 | 8/1978 | Giebel et al. | 277/210 |
| 4,341,922 | 7/1982 | Bossard et al. | 174/92 |
| 4,421,945 | 12/1983 | Moisson | 174/92 |
| 4,486,620 | 12/1984 | Ball et al. | 174/92 |
| 5,006,669 | 4/1991 | Bachel et al. | 174/93 |
| 5,155,303 | 10/1992 | Bensel, III et al. | 174/93 |
| 5,322,973 | 6/1994 | Dagan | 174/92 |
| 5,331,114 | 7/1994 | Rudolph | 174/93 |

FOREIGN PATENT DOCUMENTS

| | | |
|---|---|---|
| 0403937 | 12/1990 | European Pat. Off. . |
| 0514174 | 11/1992 | European Pat. Off. . |
| 2274125 | 1/1976 | France . |
| 2427677 | 12/1975 | Germany . |
| 2557330 | 7/1977 | Germany . |
| 3734873 | 4/1989 | Germany . |

*Primary Examiner*—Morris H. Nimmo
*Attorney, Agent, or Firm*—Hill Steadman & Simpson

[57] ABSTRACT

A cable sleeve composed of a socket pipe and end-face seal members. The matching of introduction openings in the end-face seal members to the diameters of the cables to be introduced ensues with the assistance of seal member inserts that are fit into the introduction openings and which provide cable openings for close fitting to the cable introduced therein. Sealing in parting planes is undertaken with appropriate, known sealants.

17 Claims, 3 Drawing Sheets

CABLE SLEEVE COMPOSED OF A PIPE SECTION AND SEAL MEMBERS AT THE FACE END

BACKGROUND OF THE INVENTION

The invention is directed to a cable sleeve such as for sealing cable joints and including a pipe section and seal members at the face ends having introduction openings arranged in the seal members. Typically, the pipe section is a seamed plastic conduit.

DE-A-24 27 677, corresponding to U.S. Pat. No. 4,103,911, discloses such a cable sleeve, whereby the matching of the introduction openings to the diameters of the cables to be introduced is accomplished by boring out appropriately sized holes. Special cutting tools must be utilized at the place of employment and a corresponding time outlay is thus required. An added expense, the cutting tool must be appropriately serviced.

SUMMARY OF THE INVENTION

An object of the present invention is to create a cable sleeve wherein the matching of the introduction openings in the end seal members of the cable sleeve is optimally simplified wherein no special tools are required for this purpose. The stated object is achieved with a cable sleeve of the species initially cited in that a seal member insert can be fitted into or onto an introduction opening of the end seal members, whereby the seal member insert in turn comprises at least one cable introduction opening that can be matched to the diameter of the cable to be introduced thereinto to be sealed thereto.

An advantage of the invention is that a universal cable introduction can be employed wherein a close conforming to the cables to be introduced can be undertaken in a simple way and without employing special devices. Seal member inserts having various cable introduction openings are thus employed, these being fitted either into specifically provided individual openings or directly into large introduction openings of the end seal members. These seal member inserts are longitudinally divided in the introduction direction, so that they can also be utilized at uncut cables. The sealing relative to the respective seal member or, respectively, to the introduced cable ensues with known sealing compounds that are respectively placed into the corresponding joint or parting plane. The seal member itself can be longitudinally divided in introduction direction, so that the entire end-face seal means (end seal members and seal member insert) can be utilized at uncut cables. The seal member inserts already have introduction openings that correspond to the diameters of the cables to be introduced, so that further processing is eliminated.

Another or, respectively, an additional type of matching is a diameter compensation with sealing compounds themselves that are injected, for example, into the sealing gap between the cable and the seal member insert.

Furthermore, the seal member insert can be composed of a plurality of concentric rings that are utilized above one another dependent on the required diameter. A respective layer of sealing compound serves as intermediate layer for sealing. The concentric rings, however, can also be fashioned as concentric lamellae that are torn off as needed for matching purposes. No intermediate layers of sealing compound are thus required between the individual rings.

These seal member inserts have corresponding latch elements in the longitudinally directed parting planes, as a result whereof a corresponding alignment immediately ensues upon assembly.

Conically tapering seal member "collars" or "nozzles" can also be fitted to the seal member for appropriate cable matching, whereby an additional possibility for matching by simply cutting off is established by the conical shape. A shrink hose can then preferably serve as a sealing termination.

The objects are also achieved for distributor sleeves wherein the seal member inserts comprise a plurality of outlets at one end, for example, in the form of introduction collars, whereby the other end is introduced in sealing fashion into the introduction opening of the seal member.

BRIEF DESCRIPTION OF THE DRAWINGS

FIG. 3 an end view of a seal member insert having a sealing compound between the seal member insert and the introduced cable.

DETAILED DESCRIPTION OF THE PREFERRED EMBODIMENTS

Figure 1:
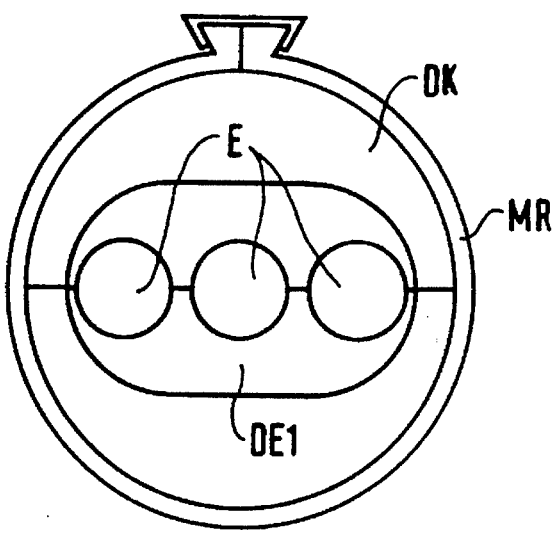
FIG. 1 is an end view of a cable sleeve having an end-face seal member wherein a seal member insert with introduction openings is introduced.

FIG. 1 shows a cable sleeve assembly or enclosure of the invention that is composed of a socket pipe or cable sleeve MR and end-face seal members DK. The seal members DK have seal member inserts DE1 as introduction regions that can be fit as needed into a corresponding end opening of the seal members DK and which in turn provide cable introduction openings E. A sealing between the seal member inserts DE1 and the seal members DK ensues in a known way with the assistance of sealant. The seal members DK as well as the seal member inserts DE1 are preferably longitudinally divided in introduction direction, so that they can also be placed over uncut cables.

Figure 2:
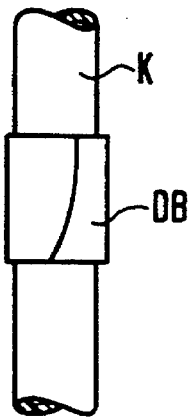
FIG. 2 is a plan view of a cable to be introduced together with a winding of sealing tape.

FIG. 2 illustrates that the seal between a respectively introduced cable K and the seal member insert DE1 can ensue with the assistance of a turn DB of sealing tape composed of sealant. The sealant can be composed of standard plastic or elastic plastic materials.

Figure 3:
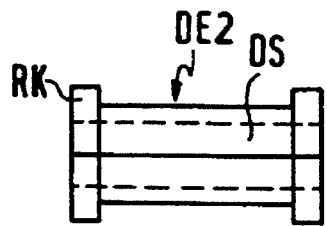
FIG. 3 is an elevational view of a seal member insert having projecting edges.

FIG. 3 shows the embodiment of a seal member insert DE2 in the form a cylindrical sealing plug DS that is introduced into an opening of the seal member DK as adaptation element, whereby outwardly projecting edges RK at the two ends form a detente from both sides, so that the sealing plug DS is fixed in longitudinal direction in the opening.

Figure 4:
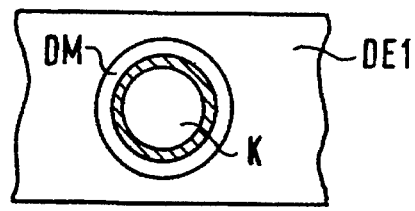

FIG. 4 illustrates an exemplary embodiment wherein the seal relative to the seal member inserts DE1 ensues with an injectable sealant DM from, for example, a cartridge.

Figure 5:
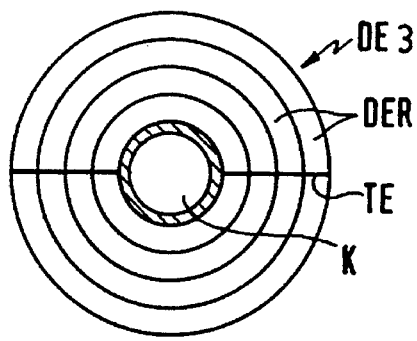
FIG. 5 is an end view of a seal member insert of concentric rings.

FIG. 5 illustrates an exemplary embodiment wherein the seal member insert DE3 is formed of a plurality of concentric seal member insert rings DER, whereby seals between the individual seal member insert rings DER made with a known sealant. The seal member insert rings are preferably fashioned as half-rings and are likewise provided with sealants in longitudinal direction in a parting plane TE.

Figure 6:
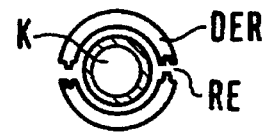
FIG. 6 is an end view of a cable and a seal member insert showing catch elements in a longitudinal joint of the seal member inserts.

FIG. 6 shows that catch elements RE, for example, in the form of channel and spring, are employed in the exemplary embodiment of FIG. 5 in the parting planes of the seal member insert rings DER, these catch elements RE producing a lateral fixing when the seal member insert DE3 is assembled.

Figure 7:
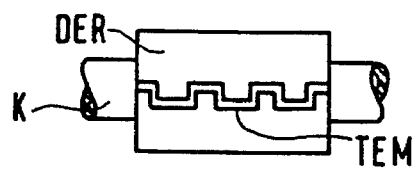
FIG. 7 an elevational view showing a meandering longitudinal joint of a seal member insert.

FIG. 7 illustrates that the seal member insert rings DER are also fixed and aligned in longitudinal direction with the assistance of catch elements in the parting plane, these being fashioned here as corresponding meander portions TEM.

Figure 8:
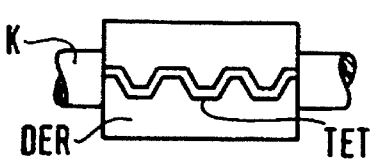
FIG. 8 is an elevational view showing a meandering trapezoidal longitudinal joint of a seal member insert.

FIG. 8 shows catch elements for seal member insert rings DER in the longitudinally directed parting plane, these being fashioned in trapezoid form TET.

Figure 9:
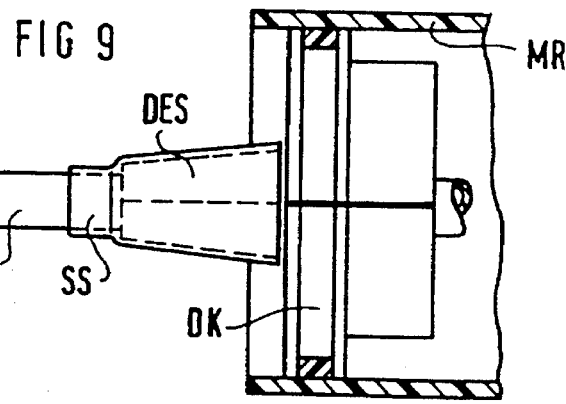
FIG. 9 is a partial cross sectional view showing a seal member insert that is fashioned as a conically tapering introduction collar.

FIG. 9 illustrates a cable sleeve having a socket pipe MR and a end-face seal member DK into which a conical seal member insert collar DES is introduced for matching to the cable K. Being conical shaped, the collar DES can be trimmed to accommodate different diameter cables. This seal member insert collar DES is expediently provided with a shrink hose SS with which the sealing relative to the cable K is undertaken.

Figure 10:
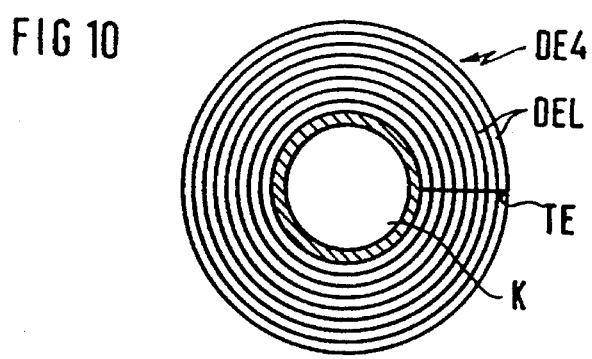
FIG. 10 Is an end view of a seal member insert of interconnected, removable, concentric rings.

FIG. 10 shows a seal member insert DE4 that is composed of interconnected, concentric lamellae DEL. These lamellae can be torn off as needed, so that the introduction opening is thereby matched to the diameter of the cable K to be introduced. The seal between the seal member and the seal member insert, as already set forth above, ensues with known sealants. This seal member insert DE4 is at least singly divided in a parting plane TE in introduction direction as well, so that it can also be employed at uncut cables.

Figure 11:
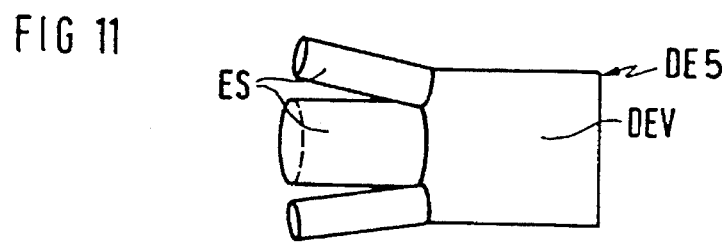
FIG. 11 is an elevational view of a seal member insert having a plurality of introduction collars.

FIG. 11 shows a seal member insert DE5 that is provided with a brancher element. It is composed of an insert piece DEV that is fitted to the seal member DK. Introduction collars ES, for example, having different diameters, are applied to an opposite end, so that a plurality of cables having different diameters can thus be introduced. These applied introduction collars ES, for example, are of shrinkable material or are covered with a shrink hose and can then be tightly shrunken onto the introduced cables.

Figure 12:
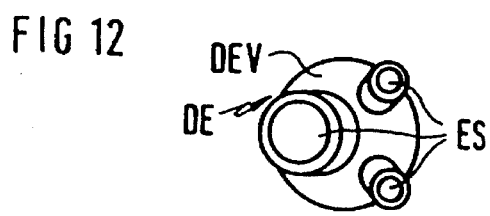
FIG. 12 is an end view of the embodiment of FIG. 11.

FIG. 12 shows the exemplary embodiment of FIG. 11 in a front view, whereby the arrangement of the introduction collars ES at the actual seal member insert piece DEV becomes particularly clear therefrom.

Although the present invention has been described with reference to a specific embodiment, those of skill in the art will recognize that changes may be made thereto without departing from the scope and spirit of the invention as set forth in the appended claims.

We claim as our invention:

1. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein, wherein the seal member insert is a cylindrical sealing plug that is introduced into the introduction opening, said cylindrical sealing plug having outwardly projecting edges at the two ends thereof forming a detente from both sides to be fixed in longitudinal direction with respect to the seal member.

2. The cable enclosure according to claim 1, wherein the seal member insert comprises individual concentric rings.

3. The cable enclosure according to claim 1, wherein the seal member insert comprises a plurality of cable openings.

4. The cable enclosure according to claim 1, wherein the seal member insert is at least singly longitudinally divided in a parting seam.

5. The cable enclosure according to claim 4, comprising catch elements arranged in the parting seam of the seal member insert.

6. The cable enclosure according to claim 4, wherein said insert comprises concentric rings, and comprising sealant introduced in said parting seam and between adjacent surfaces of the concentric rings.

7. The cable enclosure according to claim 6, wherein the sealant is composed of elastic material.

8. The cable enclosure according to claim 6, wherein the sealant is composed of plastic material.

9. The cable enclosure according to claim 1, wherein the seal member insert is composed of one of a plastic or elastic material.

10. The cable enclosure according to claim 1 further comprising sealant arranged in an annular gap between the cable to be introduced and the seal member insert.

11. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein;

wherein the seal member insert comprises interconnected, lamella-like, detachable rings.

12. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein;

wherein the seal member insert comprises a conically tapering collar.

13. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein;

wherein the insert comprises a shrink hose attached to a free end of the collar.

14. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein;

wherein the seal member insert comprises a distributor insert piece having a plurality of introduction collars.

15. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein;

wherein the seal member insert is at least singly longitudinally divided in a parting seam;

comprising catch elements arranged in the parting seam of the seal member insert; and wherein the parting seam is fashioned in a meandering shape.

16. The cable enclosure according to claim 15, wherein the parting seam is fashioned in a trapezoid meandering shape.

17. A cable enclosure having a cable sleeve and an end-face seal member with an introduction opening arranged in the seal member, further comprising:

a seal member insert fitted to said introduction opening of the seal member, said seal member insert having at least one cable opening matched to a diameter of a cable to be introduced therein;

wherein the seal member insert is composed of injectable plastic material.

* * * * *